United States Patent [19]

Yamauchi et al.

[11] Patent Number: 4,576,136
[45] Date of Patent: Mar. 18, 1986

[54] FUEL DISPENSER FOR INTERNAL COMBUSTION ENGINE

[75] Inventors: Teruo Yamauchi, Katsuta; Toshiharu Nogi, Hitachi; Yoshishige Oyama, Katsuta, all of Japan

[73] Assignee: Hitachi, Ltd., Tokyo, Japan

[21] Appl. No.: 716,942

[22] Filed: Mar. 28, 1985

[30] Foreign Application Priority Data

Mar. 28, 1984 [JP] Japan ............................ 59-58484
Jul. 26, 1984 [JP] Japan ............................ 59-156352

[51] Int. Cl.⁴ .................................. F02M 29/00
[52] U.S. Cl. ............................. 123/590; 261/DIG. 48; 123/478
[58] Field of Search ............ 123/198 E, 590, 438, 123/439, 440, 478; 261/DIG. 48

[56] References Cited

U.S. PATENT DOCUMENTS

| | | | |
|---|---|---|---|
| 4,038,348 | 7/1977 | Kompanek | 123/198 E |
| 4,106,459 | 8/1978 | Asai et al. | 123/438 |
| 4,167,158 | 9/1979 | Martin et al. | 123/590 |
| 4,176,634 | 12/1979 | Martin | 123/590 |

FOREIGN PATENT DOCUMENTS

| | | | |
|---|---|---|---|
| 2827322 | 1/1980 | Fed. Rep. of Germany | 123/590 |
| 150065 | 9/1983 | Japan | 123/590 |

*Primary Examiner*—E. Rollins Cross
*Attorney, Agent, or Firm*—Antonelli, Terry & Wands

[57] ABSTRACT

A fuel dispensing device used in an internal combustion engine comprises a throttle valve, engine operating state sensors, a control circuit producing engine control signals in response to the outputs of the sensors, a pair of intake tubes connected to an intake passage on the downstream side of the throttle valve, with each of the tubes branching at its downstream end into two parts connected to two of cylinders of the engine, an atomizer including a pair of cylindrical atomizer rings disposed in the intake tube pair and a driver for vibrating the atomizer rings in response to a control signal from the control circuit, and a pair of injection valves disposed by the respective atomizer rings. The injection valves operate to inject the fuel in response to the control signal onto the inner wall of the respective atomizer rings, so that the fuel is atomized by the vibration of the atomizer rings, while intermixing with air, and delivered to the respective cylinders.

13 Claims, 23 Drawing Figures

FUEL DISPENSER FOR INTERNAL COMBUSTION ENGINE

BACKGROUND OF THE INVENTION

The present invention relates to an internal combustion engine, such as a gasoline engine for an automobile, having an electronically-controlled fuel injection system, and particularly to a fuel dispensing device for an internal combustion engine including fuel injection valves with associated atomizers.

Recent advanced electronics in the automobile industry has involved the engine components, and several control techniques such as electronic advancer control and electronic fuel injection control have been put into practice. Particularly, the introduction of microcomputer into the control circuit has brought a further sophisticated control to the fueling system and combustion system of the engine.

However, electronic fuel injection systems available currently are still inferior in some properties to the conventional carburetor fueling systems, and they are still incomplete in the matter of cost and reliability. Possible approaches to the cost reduction of the electronic fuel injection system are a smaller number of injection valves, a lower fuel supply pressure to the injection valve, and a smaller capacity of the fuel pump. When the number of injection valves is reduced, each injection valve needs to feed more than one cylinder. However, because of uneven and relatively large fuel particles fed by the injection valve, it is difficult to fuel more than one cylinder evenly with one injection valve, and this causes a fall in the exhaust emission purify efficiency and fuel combustion efficiency, resulting in a rise in the fuel consumption and the toxic level of exhaust emission.

In order to fuel all cylinders evenly, the entry section of the intake manifold needs to be narrowed to form a collective room, but with the result of an increased manifold resistance, which hampers the upgrading of the engine output power.

For fueling all cylinders evenly with a reduced number of injection valves, there is known a method of making fine fuel particles using an ultrasonic device called "atomizer", as disclosed for example in U.S. Pat Nos. 2,949,900 and 4,106,459. This system is intended to fuel a plurality of cylinders by conducting the fuel injected with a single injector through an atomizer, allowing the even fuel distribution to all cylinders and the improvement in the performance of the engine. However, because of a single injection valve, this conventional system is not fairly applicable to high-power oriented engines and has a problem of being lacking in reliability against the failure of the injection valve.

The shortcomings of the single injection valve system naturally lead to a system using two or more injection valves, but smaller in number than the number of cylinders, i.e., applicable to engines having at least four cylinders. This modified scheme, however, needs an increased number of atomizers to match the number of cylinders, impairing the cost reduction intended by use of a smaller number of injection valves.

SUMMARY OF THE INVENTION

The present invention contemplates to overcome the foregoing prior art deficiencies, and its prime object is to provide a fuel dispenser for an internal combustion engine using two or more fuel injection valves with associated atomizers, so that the performance of engine is improved and yet cost reduction is still possible.

In order to achieve the above objective, the inventive fuel dispenser features to have a plurality of atomizers in which one ultrasonic vibrator is shared by the remaining components of each atomizer pair.

DESCRIPTION OF THE PREFERRED EMBODIMENTS

Figure 1:
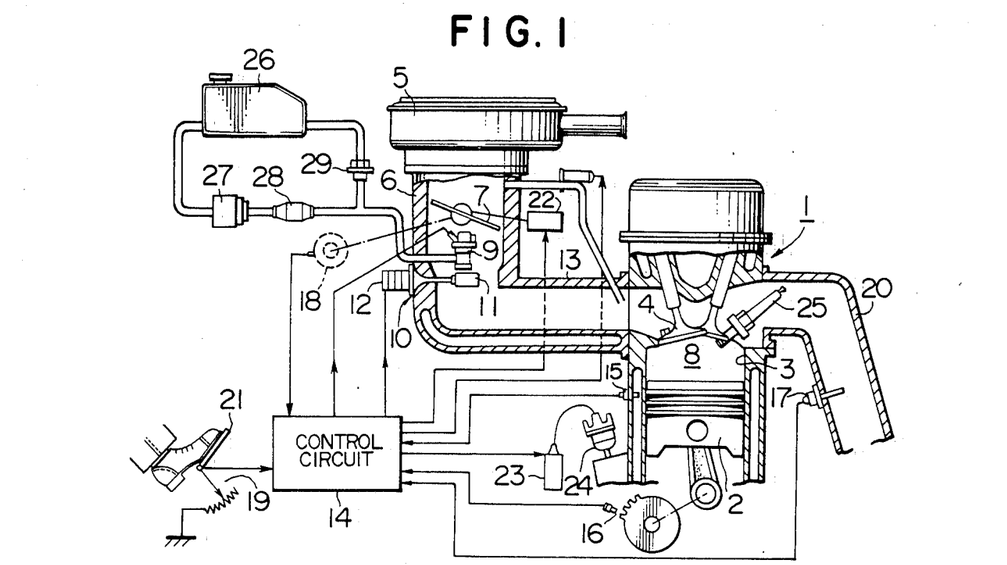
FIG. 1 is a schematic diagram showing generally the internal combustion engine provided with the inventive fuel dispenser.

In FIG. 1 showing generally a typical internal combustion engine with the provision of the inventive fuel dispenser, the engine 1 has a piston 2 which moves reciprocally in a cylinder 3, and in response to this movement an intake valve 4 opens to introduce air from the outside through an air cleaner 5 and a clearance formed between an intake pipe 6 and a throttle valve 7 into a combustion chamber 8. At the same time, an injection valve 9 located downstream by the throttle valve 7 is activated to inject the fuel, which is then formed into a spray of fuel by the action of an atomizer ring 11 in an atomizer 10, and it is carried by the intake air stream in the form of air-fuel mixture into the combustion chamber 8. The atomizer ring 11 is operated to vibrate with a ultrasonic vibrator 12 such as, for example, a piezo-electric device. The downsteam section 13 of the intake pipe forms the intake manifold, by which the mixture is distributed evenly to all cylinders.

A control circuit 14 includes a microcomputer, which is arranged to receive measurement data representing an intake air flow rate, an engine coolant temperature, an engine speed and a crank position, a residual oxygen concentration in the exhaust gas in an exhaust pipe 20, an opening degree of the throttle valve, and a position of an accelerator pedal 21, provided by an intake air flow sensor or a manifold pressure sensor (not shown), a coolant temperature sensor 15, a crank angle sensor 16, an oxygen sensor ($\lambda$ sensor) 17, a throttle valve opening sensor 18, and an accelerator position sensor 19, respectively. The measurement data is estimated in terms of the quantities of the intake air flow, fuel supply and ignition advance angle that have been set for several operating conditions and stored in the memory of the microcomputer, which in turn issues control signals and activation signals to the injection valve 9, throttle valve actuator 22 and ignition system including an ignition coil 23, distributer 24 and spark plug 25 so that the input data is kept proper for each given operating condition. Thus, the engine is controlled to an optimal state invariably in response to the position of the accelerator pedal 21 operated by the driver.

The injection valve 9 operates intermittently in response to the pulse signal supplied from the control circuit 14. The fuel is supplied to the injection valve 9 in such a way that the fuel from the outlet of a fuel tank 26 is pumped by a fuel pump 28 through a filter 27 to a certain pressure under control of a fuel pressure regulator 29, and then supplied to the injection valve 9. The surplus fuel at the regulator 29 is fed back to the fuel tank 26.

The ultrasonic vibrator 12 in the atomizer 10 is supplied with a high-frequency (e.g., above 10 kHz) drive voltage from the control circuit 14, so that it operates to atomize the fuel injected by the injection valve 9. Such an engine control system incorporating a control circuit is disclosed in, for example, U.S. Pat. No. 4,038,348.

Figure 2:
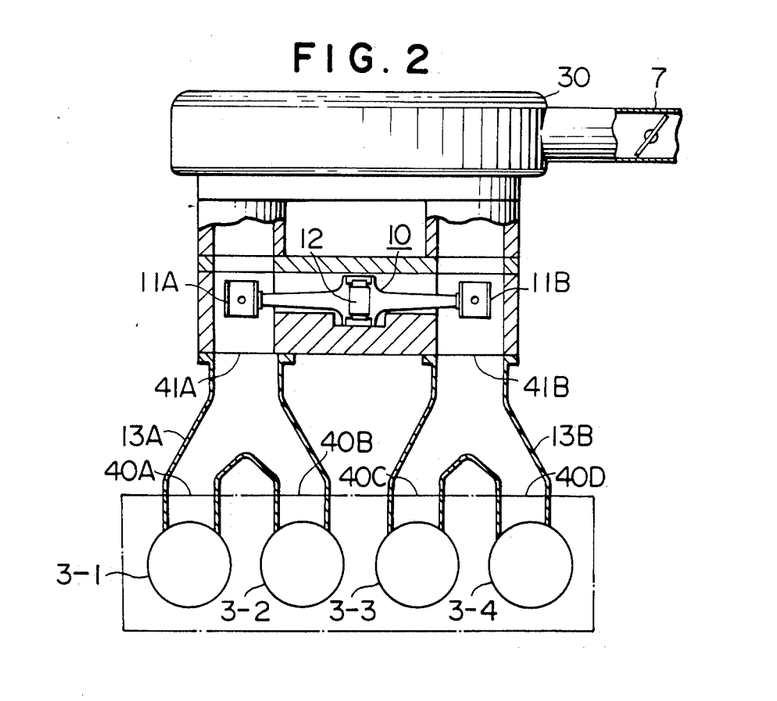
FIG. 2 is a cross-sectional view of the first embodiment of the inventive fuel dispenser.

FIG. 2 shows the first embodiment of the inventive fuel dispenser, which is in this case designed for a 4-cylinder engine, as an example. Two manifolds 13A and 13B are provided, each supplying the mixture to two cylinders of the 4-cylinder engine. On the upstream side, the manifolds 13A and 13B are joined together by a collective tube 30 having a capacity larger than that of a cylinder of the engine so that the inertia of suction is expanded thereby to reduce the pulsating air flow. The amount of intake air flow in this intake system is controlled through the opening of a throttle valve 7 provided on the upstream side of the collective tube 30 and the degree of opening of the throttle valve 7 is detected by the throttle opening sensor 18 and indicated to the microcomputer in the control circuit. At the outlets of the collective tube 30 where inlets 41A and 41B of the intake manifolds 13A and 13B are to be coupled, there is inserted the ultrasonic vibrator 12 as shown. The ultrasonic vibrator 12 is provided with symmetrical horns, at the ends of which are fixed atomizer rings 11A and 11B, and these components in combination constitute an atomizer 10. The atomizer rings 11A and 11B are located so that their centers are substantially in alignment with the centers of the manifold inlets 41A and 41B, respectively. Fuel injection valves 9A and 9B are disposed near the atomizer rings 11A and 11B, respectively.

The manifolds 13A and 13B have pairs of outlets 40A, 40B, and 40C, 40D, respectively, which communicate with the manifold inlets 41A and 41B, respectively. The atomizer 10 is disposed as if it bridges the two manifold inlets 41A and 41B, and the atomizer rings 11A and 11B are located on the central axes of the manifold inlets 41A and 41B. The manifold inlets 41A and 41B belong to the manifolds 13A and 13B, respectively. The manifold 13A has the manifold outlets 40A and 40B, and the manifold 14B has the manifold outlets 40C and 40D. The manifold outlets 40A, 40B, 40C and 40D are connected to four cylinders 3-1, 3-2, 3-3 and 3-4, respectively. Thus, the injection valve 9A, atomizer ring 11A, manifold 13A and cylinder pair 3-1 and 3-2 in combination constitute one intake system, while the injection valve 9B, atomizer ring 11B, manifold 13B and cylinder pair 3-3 and 3-4 in combination constitute another intake system.

Figure 3:
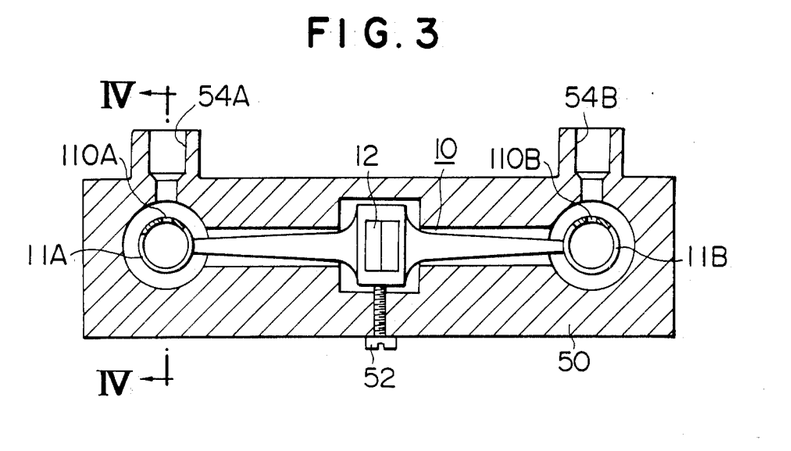
FIG. 3 is a cross-sectional view of the atomizer incorporated in the inventive fuel dispenser.

Next, the disposition of the atomizer 10 will be described. As shown in FIG. 3, the atomizer 10 is constructed within a block 50. The atomizer rings 11A and 11B, which are in a cylindrical shape, have on their top the formation of blow-in holes 110A and 110B, respectively. In the upper sections of the block 50 above the blow-in holes 110A and 110B, there are formed injection valve mount holes 54A and 54B, respectively, so that their centers are in alignment with the centers of the corresponding blow-in holes 110A and 110B. The arrangement is made such that all the fuel injected by the injectors mounted in the holes 54A and 54B impinges the interior wall of the atomizer rings 11A and 11B. The atomizer 10 is secured at its center to the block 50 using a bolt 52.

Figure 4:
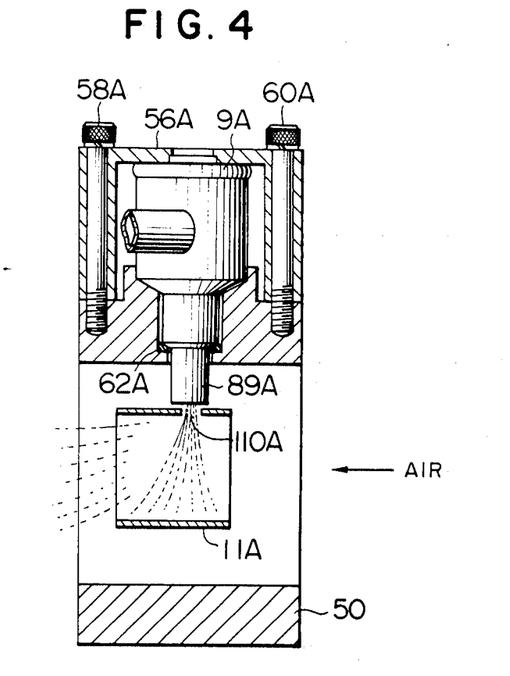
FIG. 4 is a cross-sectional view taken along the line IV—IV of FIG. 3.

FIG. 4 is another cross-sectional view of the atomizer 10 taken along the line IV—IV of FIG. 3, showing the injection valve 9A mounted in the injection valve mount hole 54A. In the figure, the atomizer ring 11A and the injection valve 9A are in such a positional relationship that the blow-in hole 110A at the top of the ring is in alignment with the axis of injection port 89A of the injection valve 9A with a clearance of about 1 mm provided between the two members. The blow-in hole 110A is located slightly off the center of the atomizer ring 11A toward the upstream side of the air path, in consideration that the fuel injected from the injection port 89A of the injection valve 9A is drifted by the intake air flow before impingement on the interior wall of the atomizer ring 11A. The injection valve 9A is secured firmly to the block 50 using a cover 56A and bolts 58A and 60A, with an O-ring 62A being interposed between the block and the injector valve at its section above the injection port 89A for the purpose of vibration damp and hermetic seal.

This embodiment divides four cylinders of the engine into two groups each provided with an individual fuel injection valve. The fuel injected by the injection valve 9A is atomized with the associated atomizer ring 11A, and therefore can be distributed evenly to both cylinders. This prevents the disparity of fuel supply to all cylinders, and is effective for increasing the output power of the engine. In addition, each cylinder is filled with the air-fuel mixture more efficiently, that improves the cold-start behavior of the engine.

Figure 5:
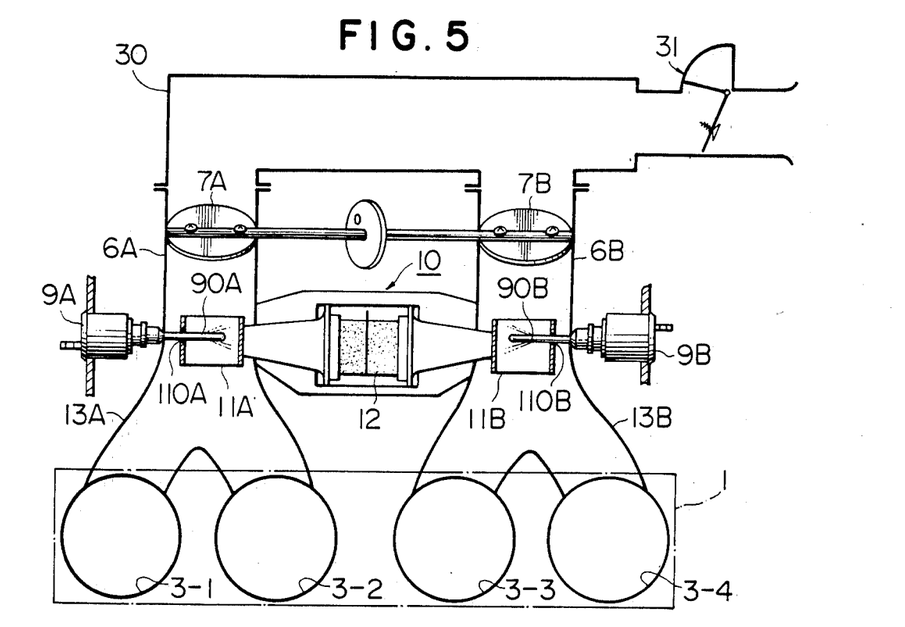
FIG. 5 is a schematic diagram showing the second embodiment of the inventive fuel dispenser.

FIG. 5 shows the second embodiment of the inventive fuel dispenser, which is also applied to a 4-cylinder engine. In this embodiment, two throttle valves 7A and 7B are provided in two intake tubes 6A and 6B, respectively. The intake tube 6A, throttle valve 7A, injection valve 9A, atomizer ring 11A and intake manifold 13A in combination constitute one intake system for cylinders 3-1 and 3-2, while the intake tube 6B, throttle valve 7B, injection valve 9B, atomizer ring 11B and intake manifold 13B in combination constitute another intake system for cylinders 3-3 and 3-4. The throttle valves 7A and 7B have a common drive shaft, and the ultrasonic vibrator 12 in the atomizer 10 is shared by two atomizer rings 11A and 11B as in the first embodiment. Reference number 31 denotes an air flow meter provided on the upstream side of the collective tube 30.

The injection valves 9A and 9B have their elongate nozzle pipes 90A and 90B extending into the respective intake tubes 6A and 6B and further extending to the interior of the respective atomizer rings 11A and 11B through holes 110A and 110B formed in the wall of the rings. Different from the previous embodiment, the injectors 9A and 9B are mounted on the longitudinal axis of the atomizer 10 in this embodiment. Each of the nozzle pipes 90A and 90B are provided with a number of nozzle holes on its side wall, so that the fuel injected from the injection valves 9A and 9B impinges directly on the interior wall of the atomizer rings 11A and 11B for atomization.

The air stream introduced through the air cleaner into the collector 30 is divided into two streams in the intake tubes 6A and 6B, and, after being mass-controlled by the respective throttle valves 7A and 7B, entered to the respective manifolds 13A and 13B in which the air streams mixed with the fuel which has been injected by the respective injectors 9A and 9B and atomized by the respective atomizer rings 11A and 11B independently are distributed to a cylinder pair 3-1 and 3-2 and another cylinder pair 3-3 and 3-4.

This embodiment, as in the previous embodiment, uses two injection valves so as to increase the output power of the engine and enhance the reliability of the injection system; nevertheless the associated atomizer 10 has many common components for the two atomizer rings 11A and 11B, forming "twin atomizers", which allows the reduction of manufacturing cost.

As in the first embodiment, each of the manifolds 13A and 13B branches into two at its downstream end in a symmetrical fashion with respect to the fuel injecting position, resulting in a superior distributive characteristic in concert with the twin atomizers.

Moreover, the arrangement of the atomizer 10 in this embodiment enables almost all the fuel injected from the injection valves 9A and 9B to impinge directly to the inner surface of the atomizer rings 11A and 11B, with an extremely small part of the fuel being caught on the interior wall of the intake tubes 6A and 6B, whereby the fuel is atomized perfectly and the control of air-fuel ratio can be performed with a minimal time lag.

Figure 6:
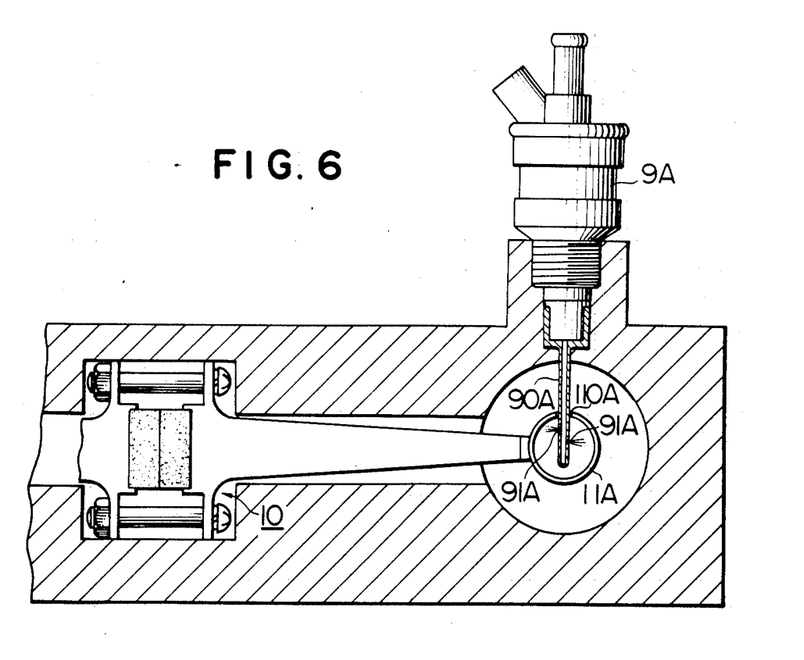
FIG. 6 is a cross-sectional view of part of the second embodiment.

FIG. 6 shows in detail the nozzle pipe of the injection valve and the atomizer ring in the arrangement of the second embodiment. The elongate nozzle pipe 90A is provided with a certain number of injection holes 91A that confront the inner surface of the atomizer ring 11A. When the injection valve 9A is activated to open, the pressurized fuel is injected through the injection holes 91A onto the inner surface of the ring 11A. Different from the arrangement of FIG. 5, the injection valve 9A is shown to be mounted perpendicularly to the longitudinal axis of the atomizer 10 for illustrative purposes.

Figure 7A:
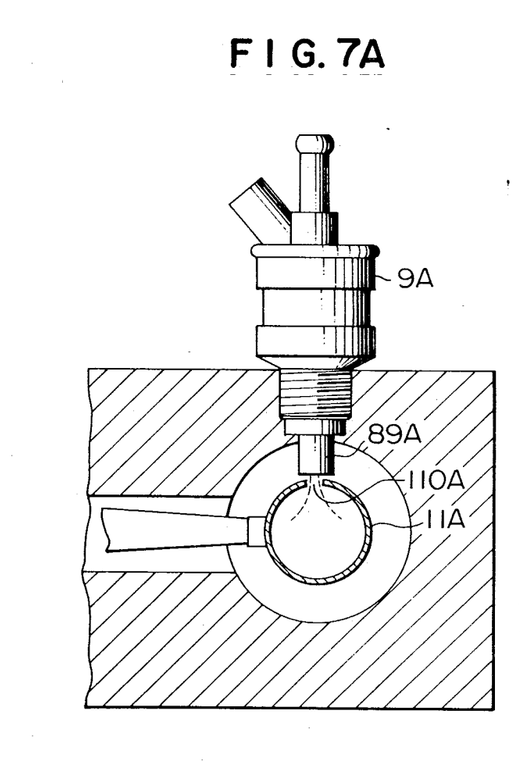
FIGS. 7A and 7B are cross-sectional views of the modified structures of the second embodiment.
Figure 7B:
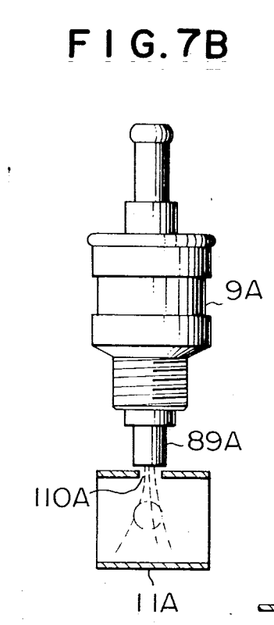

FIGS. 7A and 7B show a modified arrangement of the second embodiment. The injection valve 9A is of a common type having an injection port 89A provided in the vicinity of the atomizer ring 11A so that the fuel is injected through the flow-in hole 110A into the interior of the ring 11A, as in the case of FIG. 4. This arrangement performs atomization of fuel satisfactorily, while eliminating the need for a special injector, whereby further cost reduction is made possible.

Figure 8:
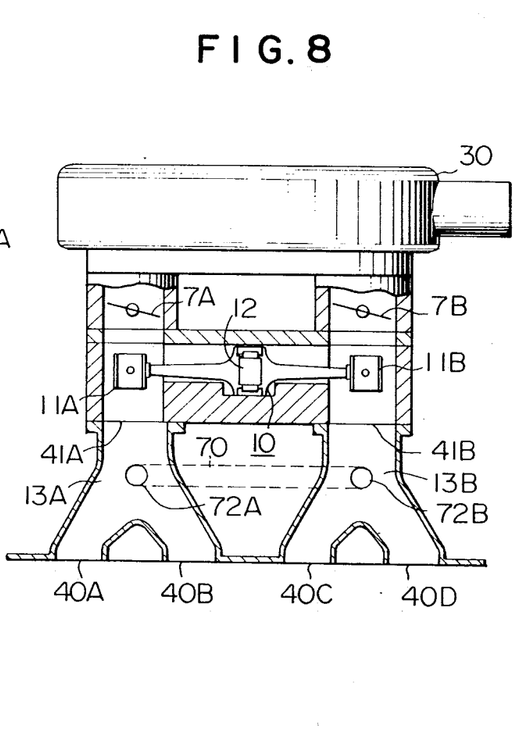
FIG. 8 is a cross-sectional view of the third embodiment of this invention.
Figure 9:
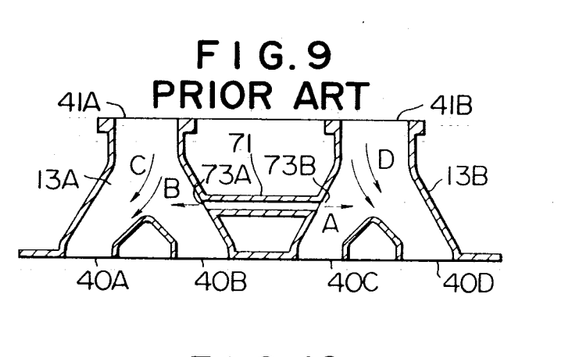
FIG. 9 is a cross-sectional view of a conventional manifold.
Figure 10:
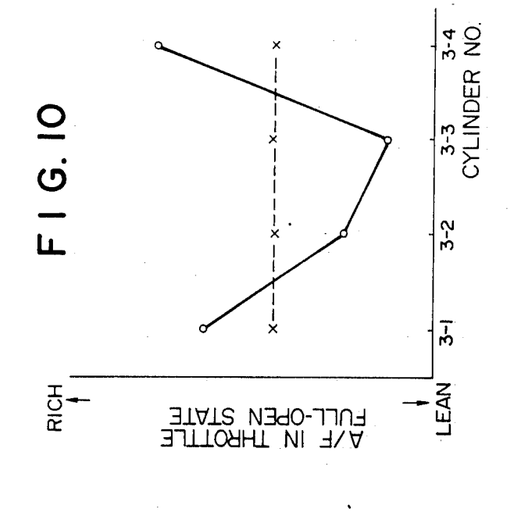
FIG. 10 is a graph showing the air-fuel ratio of the mixture produced by the conventional manifold shown in FIG. 9 and by the third embodiment of this invention.

FIG. 8 shows the third embodiment of the present invention, and it is substantially identical to the second embodiment with the following exception. The new arrangement includes a duct 70 for allowing the passage of the mixture between the manifolds 13A and 13B so as to absorb the pressure wave created in the manifolds. The duct 70 opens its ports 72A and 72B in the wall of the respective manifolds 13A and 13B at positions each equidistant from both outlets of each manifold. In this respect, the conventional manifold assembly as shown in FIG. 9 has a duct 71 with its ports 73A and 73B located nearer to the outlets 40B and 40C, respectively. On this account, when one of the cylinders 3-2 and 3-3 is in intake stroke, an air flow occurs through the duct 71 as shown by an arrow A, causing the main stream of the mixture to be drifted toward the cylinder 3-1 as shown by an arrow C, resulting in a richer mixture for that cylinder. When one of the cylinders 3-1 and 3-4 is in intake stroke, the duct 71 conducts an air flow as shown by an arrow B, causing a drifted mixture stream as shown by an arrow D, resulting in a richer mixture for the cylinder 3-4. The unbalanced air stream inherent in the conventional manifold structure (FIG. 9) creates uneven air-fuel ratio among the cylinders as shown by the solid line in FIG. 10, causing a disturbance in the output torque, and a high-output performance of the engine cannot be expected. The disposition of the duct 70 according to the third embodiment of this invention enables an uniform air-fuel ratio among all cylinders as shown by the dashed line in FIG. 10, whereby a high-output performance of the engine can be achieved.

Figure 11:
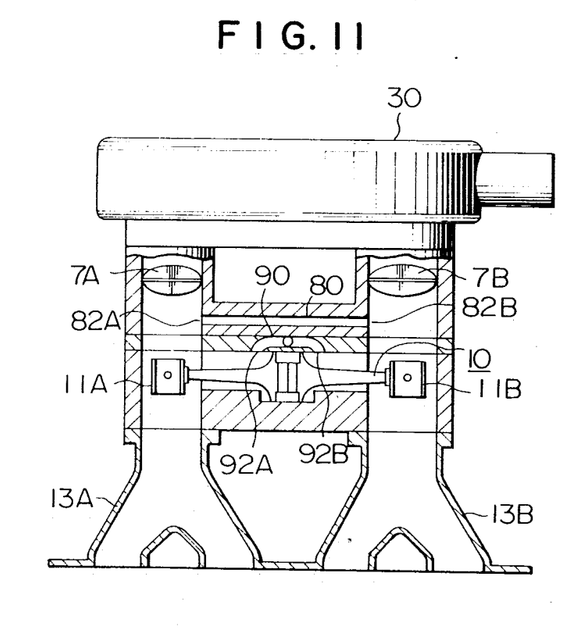
FIG. 11 is a cross-sectional view of the fourth embodiment of this invention.

FIG. 11 shows the fourth embodiment of the present invention. This embodiment differs from the third embodiment in that a duct 80 is disposed so that it opens its ports 82A and 82B on the upstream side of the atomizer rings 11A and 11B, in place of the previously mentioned duct 70. In this arrangement, even if the duct 80 causes a drift of air stream in each intake tube, it does not affect the composition of the air-fuel mixture supplied to each cylinder. This embodiment is further provided with a duct 90 for the process of blow-bye gas, with its out ports 92A and 92B opening in the vicinity of the atomizer rings 11A and 11B so that the hot blow-bye gas blows onto the atomizer rings 11A and 11B.

The atomizer rings 11A and 11B are cooled due to the atomization (accompanied by vaporization) of the fuel, and this causes condensation of moisture in the air and then formation of drops of water, which turn pieces of ice sticking on the horn section of each atomizer ring, resulting possibly in damped vibration of the ring. The blow of the hot blow-bye gas onto the atomizer rings prevents the freezing of the rings, thereby ensuring the normal operation of the atomizer.

Figure 12:
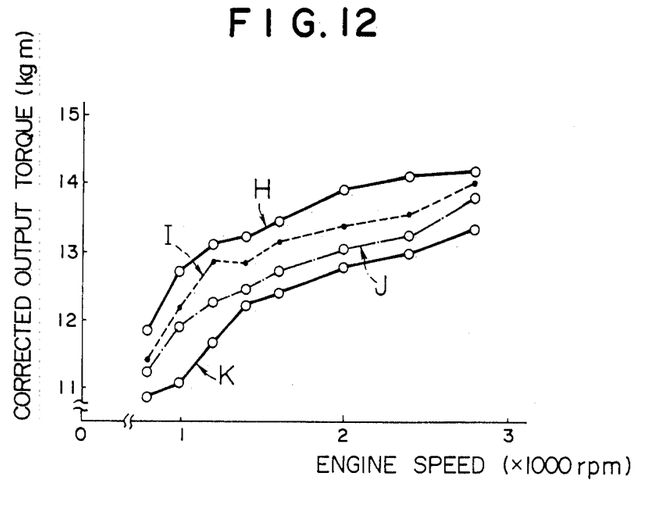
FIG. 12 is a graph showing the torque-speed characteristics of the engine.

FIG. 12 is a graphical representation showing the torque-speed characteristics of internal combustion engines, with a full-open throttle at which intake pulsation occurs, employing the fuel dispenser of the fourth embodiment of this invention (plot H), the fuel dispenser of the currently available EGI system (plot I), the conventional fuel dispenser using a single injector and atomizer (plot J), and the conventional carburetor (plot K). As indicated on the graph, the fourth embodiment of this invention is superior in the output power to the conventional fueling systems of EGI and carburetor.

It should be noted that the ducts 80 and 90 in the fourth embodiment may also be provided for the arrangement of the first embodiment.

As can be appreciated from the above description, the inventive fuel dispenser can also be applied to internal combustion engines in which a single injection valve is used to fuel a plurality of cylinders, so that unstable combustion in each cylinder is prevented even in the operation using a low-quality fuel thereby to produce high output power.

Figure 13:
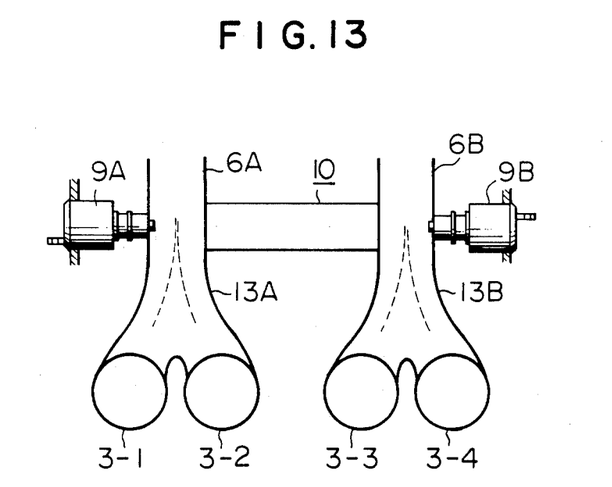
FIG. 13 is a schematic diagram showing the arrangement of the inventive fuel dispenser.
Figure 14:
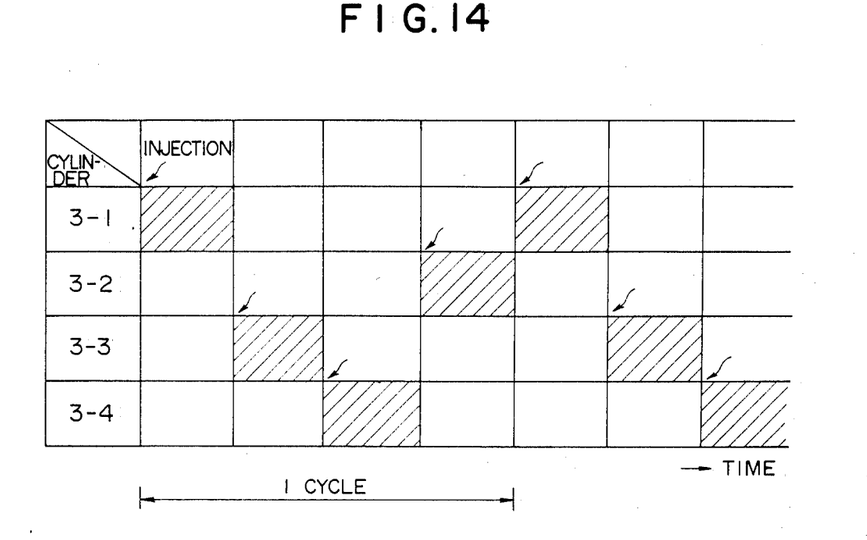
FIG. 14 is a chart showing the injection timing of the injection valves.
Figure 15:
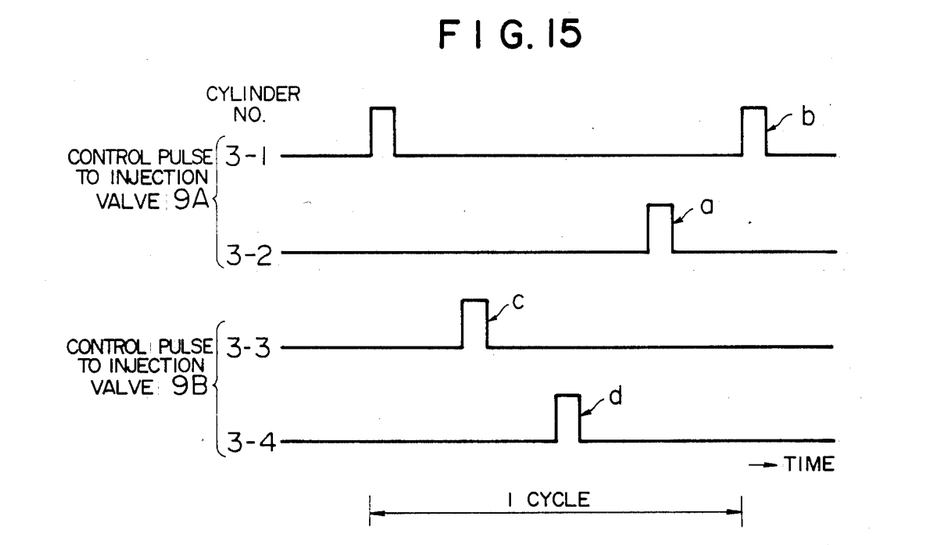
FIG. 15 is a timing chart showing, as an example, the timing of control pulses applied to the injection valves.

Next, the control for the two injection valves 9A and 9B in the foregoing embodiments will be described. In FIG. 13 showing simply the arrangement of the four cylinders and two injection valves of the foregoing embodiments, the first cylinder 3-1 and second cylinder 3-2 are fueled by the injection valve 9A, and the third cylinder 3-3 and fourth cylinder 3-4 are fueled by the injection valve 9B. It is necessary for fuel injection to take place at the beginning of intake stroke of each cylinder as shown in FIG. 14, and the control circuit 14 issues the control pulses to the injection valves 9A and 9B as shown in FIG. 15. The injection operation in the sequence of timing shown in FIG. 14 is called "intake-synchronized injection". In the figure, the hatched portions represent intake stroke, and the arrows indicate the timing of injection. According to the intake-synchronized injection, as will be seen from FIG. 15, each of the injection valves 9A and 9B receives two control pulses successively, i.e., the injection valve 9A operates successively at pulses a and b, and then the injection valve 9B operates successively at pulses c and d.

Figure 16:
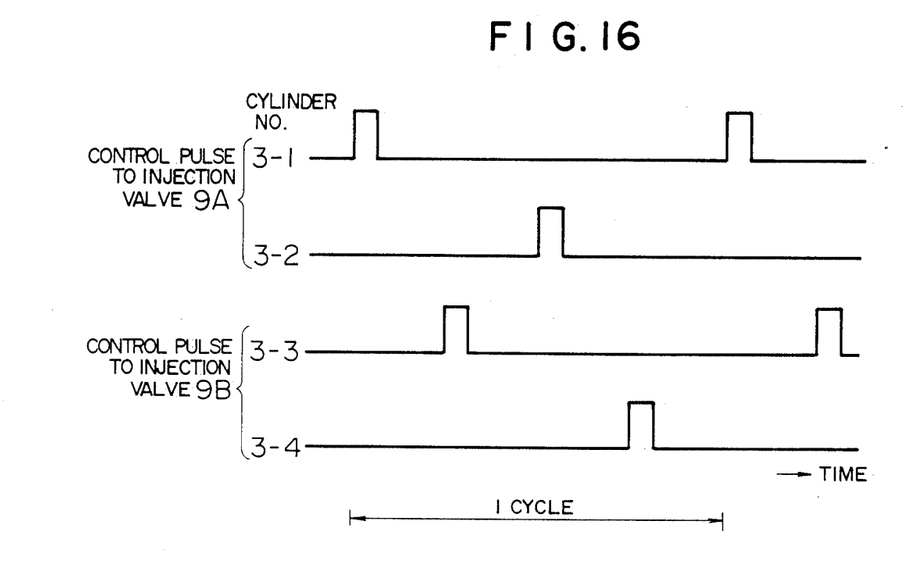
FIG. 16 is a timing chart showing another example of the timing of control pulses applied to the injection valves.
Figure 17:
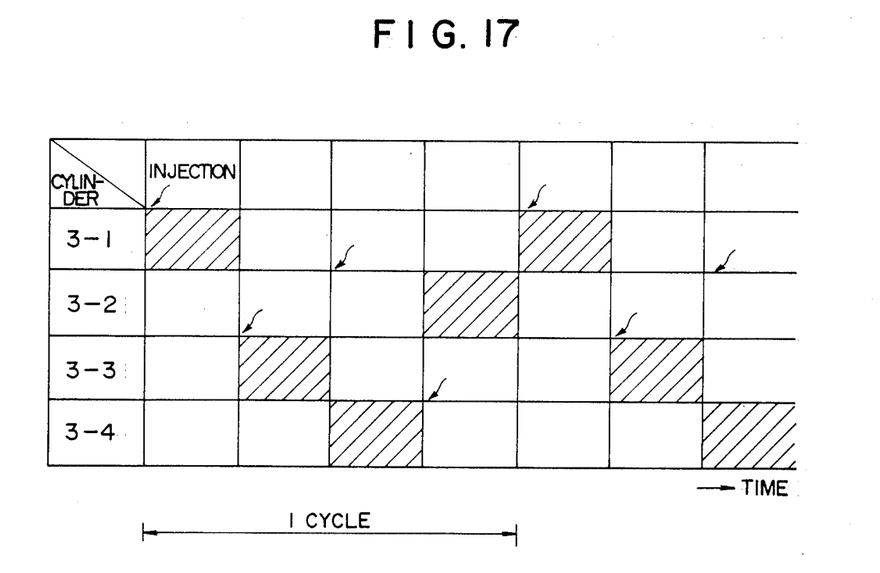
FIG. 17 is a chart showing the injection timing of the injection valves.

Another injection control mode called "alternate injection" is shown in FIG. 16, in which the injection valves 9A and 9B operate alternately. In alternate injection mode shown in FIG. 16, the four cylinders have respective intake strokes as shown in FIG. 17 for example, and it is not possible for all cylinders to have fuel injection equally at beginning of the respective intake strokes.

Figure 18:
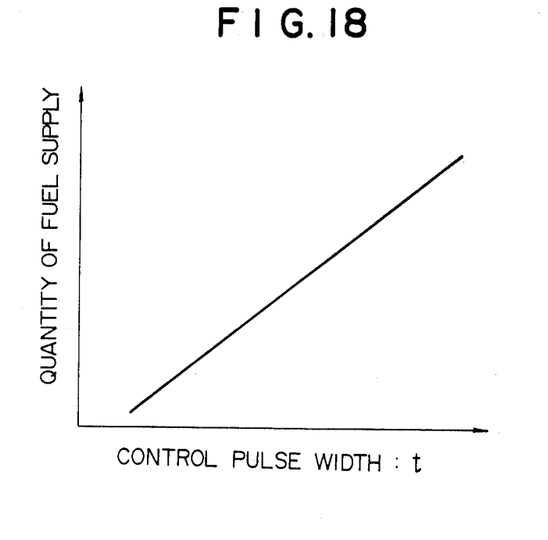
FIG. 18 is a graph showing the amount of fuel injection plotted against the injector control pulse width.
Figure 19:
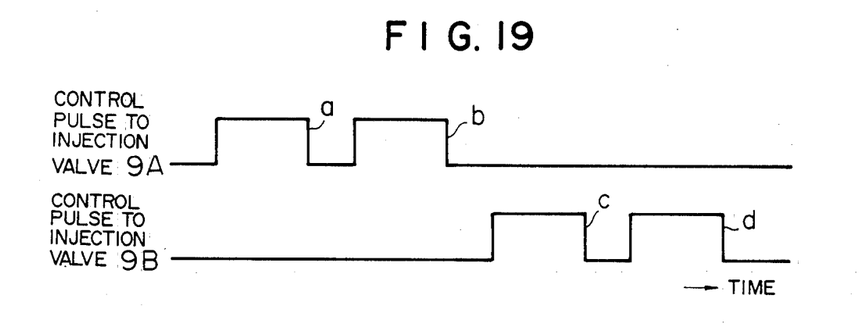
FIG. 19 is a waveform diagram showing the injection control pulses in intake-synchronized injection mode.
Figure 20:
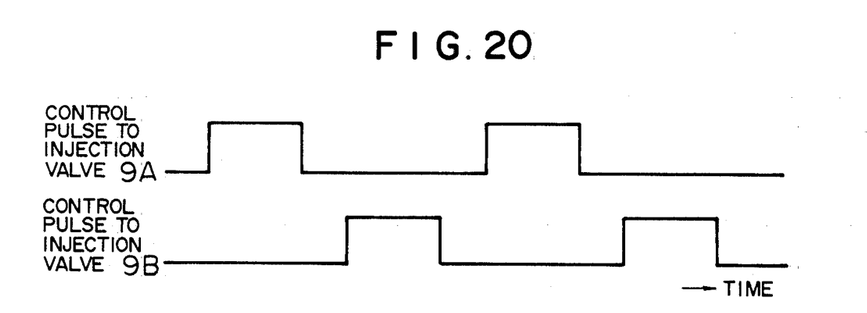
FIG. 20 is a waveform diagram showing the injection control pulses in alternate injection mode.

FIG. 18 shows the relationship between the time width t of control pulses to the injection valves 9A and 9B and the quantity of fuel supply Q. When the engine employing the intake-synchronized injection system runs in an operating region of a large load and high speed, the control pulses a and b applied consecutively to the injection valve 9A and control pulses c and d to the valve 9B have little time spacing between the two pulses as shown in FIG. 19, and as an extreme case both pulses can be continuous. On this account, it is difficult for the intake-synchronized injection system to perform accurate control as compared with the alternate injection system that exhibits the pulse waveforms in FIG. 20 in the same engine operating condition.

Nevertheless, the intake-synchronized injection system achieves the most suitable timing of fuel delivery to each cylinder as shown in FIG. 14. Therefore, it is desirable to split the engine operating region into two in terms of the engine speed, for example 3,000 rpm, and to operate the engine in intake-synchronized injection mode in the low-speed region and in alternate injection mode in the high-speed region. In one embodiment of this invention in this respect, the sensor 16 shown in FIG. 1 provides a pulse signal to the control circuit 14, which switches the injection control mode depending on the engine speed detected by the pulse signal from the sensor 16 and supplies the respective control pulses to the injection valves. This embodiment achieves accurate fueling control invariably in any load condition, whereby the performance of the engine can readily be upgraded using injection valves of the same ability.

Figure 21:
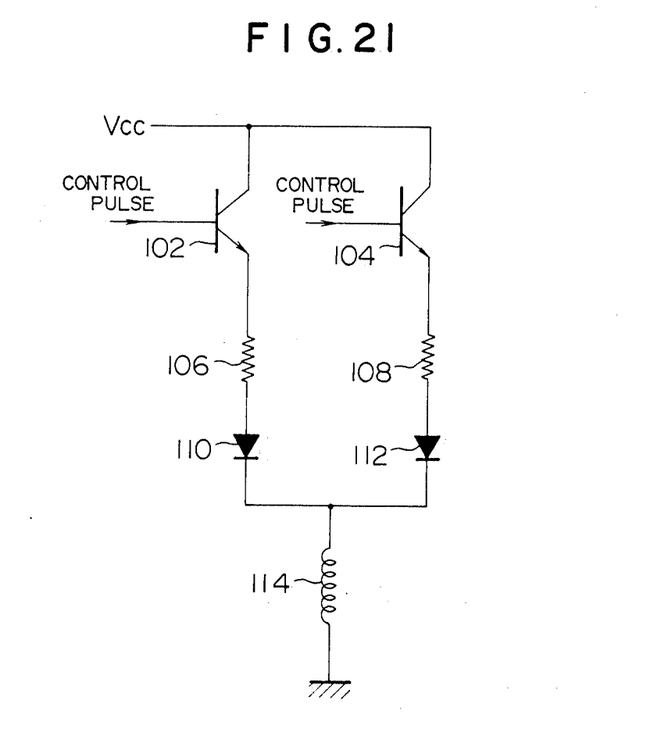
FIG. 21 is a schematic diagram exemplifying the injection valve drive circuit.

FIG. 21 shows an embodiment of the circuit arrangement for driving one of the injection valves 9A and 9B used in the foregoing embodiments. The arrangement includes switching power transistors 102 and 104, current limiting resistors 106 and 108, and diodes 110 and 112 that function as a logical OR gate for a current conducted through either transistor 102 or 104 to a drive coil 114 of the injection valve. As has been described in connection with FIGS. 15 and 16, the control circuit 14 supplies, in most cases, isolated control pulses for all cylinders. Accordingly, the drive circuit shown in FIG. 21 can readily control one injection valve in response to control pulses for two cylinders.

Figure 22:
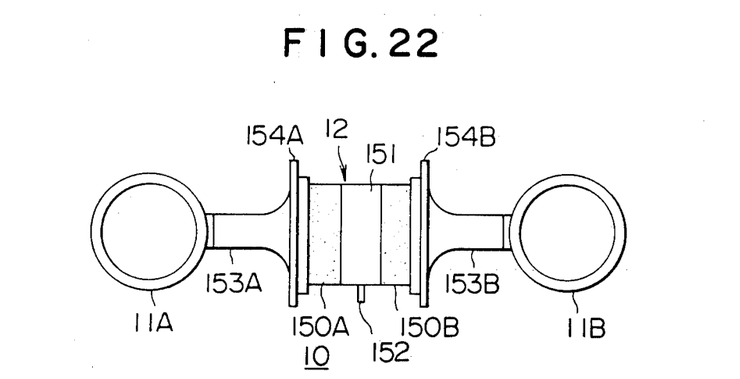
FIG. 22 is a cross-sectional view of an example of the atomizer used in the inventive fuel dispenser.

FIG. 22 shows an example of the twin atomizers used in the inventive fuel dispenser, and it consists of vibrators such as electrostrictive devices 150A and 150B, a central electrode 151, a terminal 152, horns 153A and 153B, and flanges 154A and 154B also working as outer electrodes. In operation, a high-frequency voltage (e.g., 20–30 kHz as mentioned earlier) produced in the control circuit 14 is applied between the central electrode 151 and the flanges 154A and 154B, and thickness vibration arises in the devices 150A and 150B. By the impedance matching and amplification of the horns 153A and 153B, the vibration is propagated to both atomizer rings 11A and 11B. The central electrode 151 also works to reflect the vibration created by the devices 150A and 150B, as required for the efficient vibration of the atomizer rings 11A and 11B. By making the electrode 151 in a certain thickness, the distance between both rings 11A and 11B can be adjusted. Although in the foregoing embodiments, the ultrasonic vibrator 12 in the atomizer 10 is formed of an electrostrictive device including a piezo-electric device, the present invention is not limited to this, but a magnetostrictive device or other proper electromechanical transducer may of course be used.

As described above, the inventive fuel dispenser is capable of upgrading the output power and enhancing the reliability of internal combustion engines, while using injection valves smaller in number than cylinders, whereby the prior art deficiencies can be overcome and the construction cost can be reduced consistently.

Although the foregoing embodiments have been described for a 4-cylinder engine, the present invention can of cource be applied to internal combustion engines having an even-number of cylinders, including V-type engines.

We claim:

1. A fuel dispensing device used in an internal combustion engine comprising:
   throttle valve means;
   a sensor for detecting an operational state of the engine;
   a control circuit which produces an engine control signal based on the output of said sensor;

an even number of intake tubes connected to an intake passage on the downstream side of said throttle valve means, with each of said tubes branching at the downstream end thereof into two parts that are connected to two cylinders of the engine;

at least one atomizer provided for at least a pair of said intake tubes, said atomizer comprising a pair of cylindrical atomizer rings disposed in said intake tube pair and a driver for driving said atomizer ring pair in response to the control signal from said control circuit; and an even number of injection valves each provided for each of said atomizer ring so as to inject fuel onto the interior wall of said atomizer ring through a hole formed in the wall of said atomizer ring, so that the fuel is atomized by the vibration of said atomizer rings, while intermixing with air, and delivered to respective cylinders.

2. A fuel dispensing device according to claim 1, wherein said throttle valve means comprises a throttle valve disposed in an intake passage, said intake passage being connected at the downstream side thereof to said even number of intake tubes through a collective tube having a capacity equal to or larger than the capacity of one of said cylinders.

3. A fuel dispensing device according to claim 1, wherein said even number of intake tubes are connected at the upstream side thereof to a collective tube having a capacity equal to or larger than the capacity of one of said cylinders, said throttle valve means comprising throttle valves equal in number to the number of said intake tubes, said throttle valves being disposed on the upstream side of said respective atomizer rings within said intake tubes.

4. A fuel dispensing device according to claim 2, further comprising a duct for each pairing intake tubes with each end thereof opening at a substantially central position of said intake tube so that said intake tubes communicate with each other.

5. A fuel dispensing device according to claim 3, further comprising a duct for each pair of intake tubes with each end thereof opening at a substantially central position of said intake tube so that said pairing intake tubes communicate with each other.

6. A fuel dispensing device according to claim 2, further comprising a duct for connecting each pairing intake tubes to each other at a position on the downstream side of said throttle valve and upstream side of said atomizer rings, and a passage for conducting blow-bye gas to a vicinity of each pair of said atomizer rings so that said rings are heated.

7. A fuel dispensing device according to claim 3, further comprising a duct for connecting each pairing intake tubes to each other at a position on the downstream side of said throttle valves and upstream side of said atomizer rings, and a passage for conducting blow-bye gas to a vicinity of each pair of said atomizer rings so that said rings are heated.

8. A fuel dispensing device according to claim 2, wherein each of said injection valves has at least one nozzle hole that opens inside said atomizer ring so that injected fuel impinges directly onto the inner surface of said ring.

9. A fuel dispensing device according to claim 3, wherein each of said injection valves has at least one nozzle hole that opens inside said atomizer ring so that injected fuel impinges directly onto the inner surface of said ring.

10. A fuel dispensing device according to claim 2, wherein said control circuit is operable by switching in intake-synchronized injection mode or alternate injection mode for fueling said cylinders depending on the rotational speed of the engine.

11. A fuel dispensing device according to claim 10, wherein said control circuit is operable by switching in said intake-synchronized injection mode in a predetermined lower engine speed region or in said alternate injection mode in a predetermined higher engine speed region.

12. A fuel dispensing device according to claim 3, wherein said control circuit is operable by switching in intake-synchronized injection mode or alternate injection mode for fueling said cylinders depending on the rotational speed of the engine.

13. A fuel dispensing device according to claim 12, wherein said control circuit is operable by switching in said intake-synchronized injection mode in a predetermined lower engine speed region or in said alternate injection mode in a predetermined higher engine speed region.

* * * * *